Nov. 18, 1947.  P. HAIG ET AL  2,431,245
LANDING GEAR FOR TRAILERS AND THE LIKE
Filed Feb. 5, 1945  4 Sheets-Sheet 4
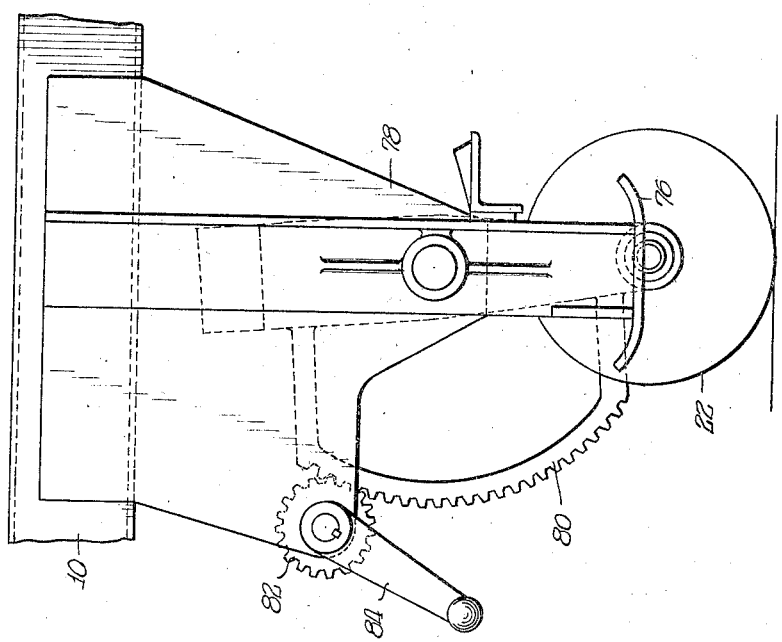
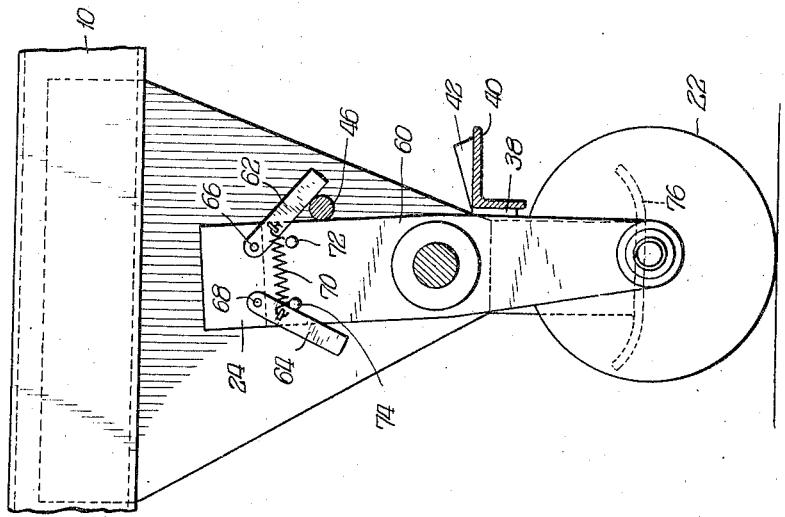
INVENTORS.
Paul Haig,
Michael Schillo,
BY John Tompkins, Patented Nov. 18, 1947

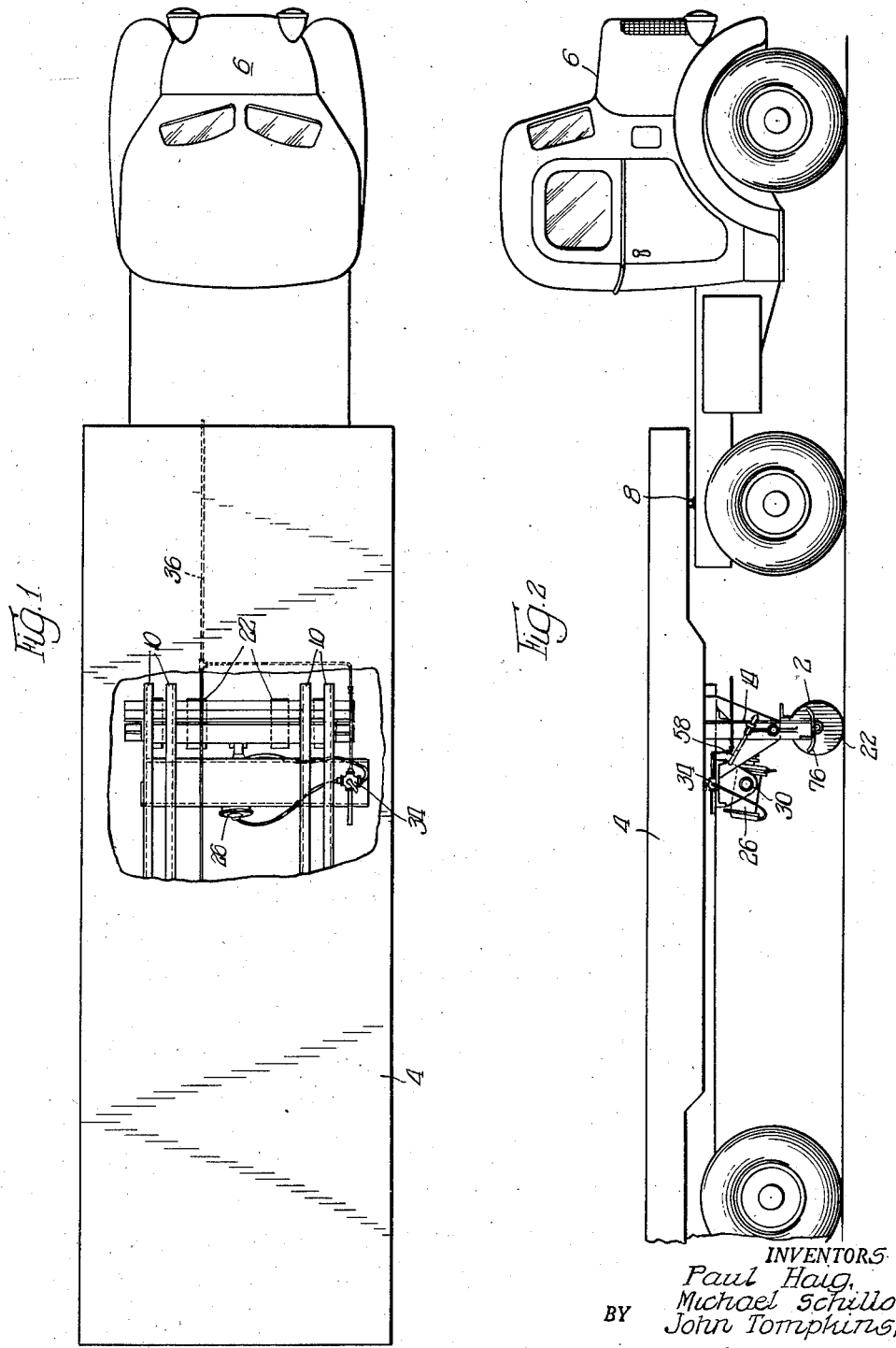

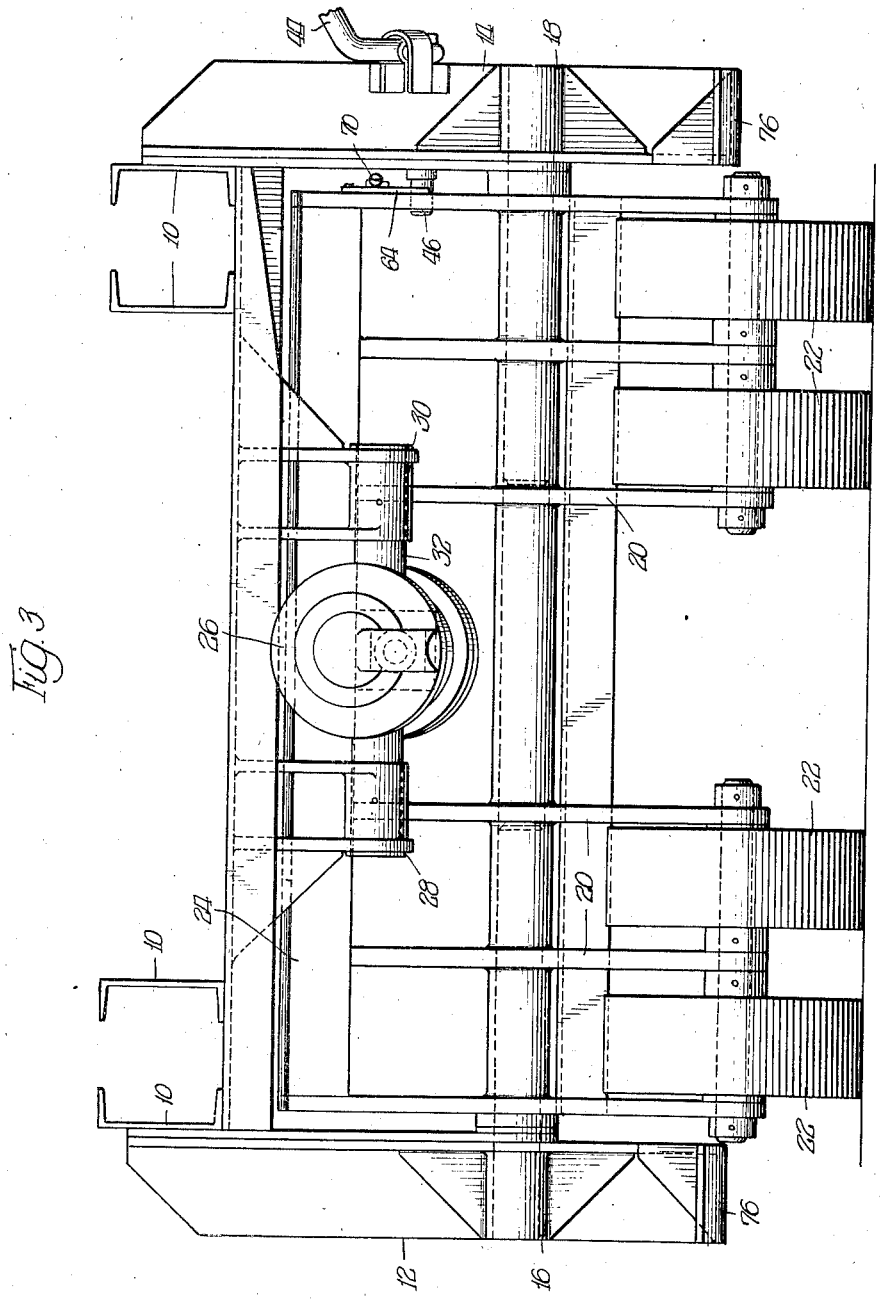

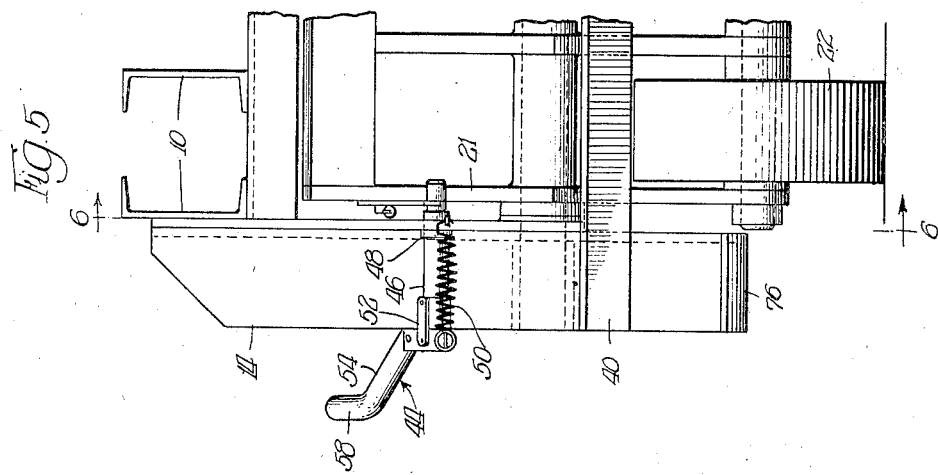
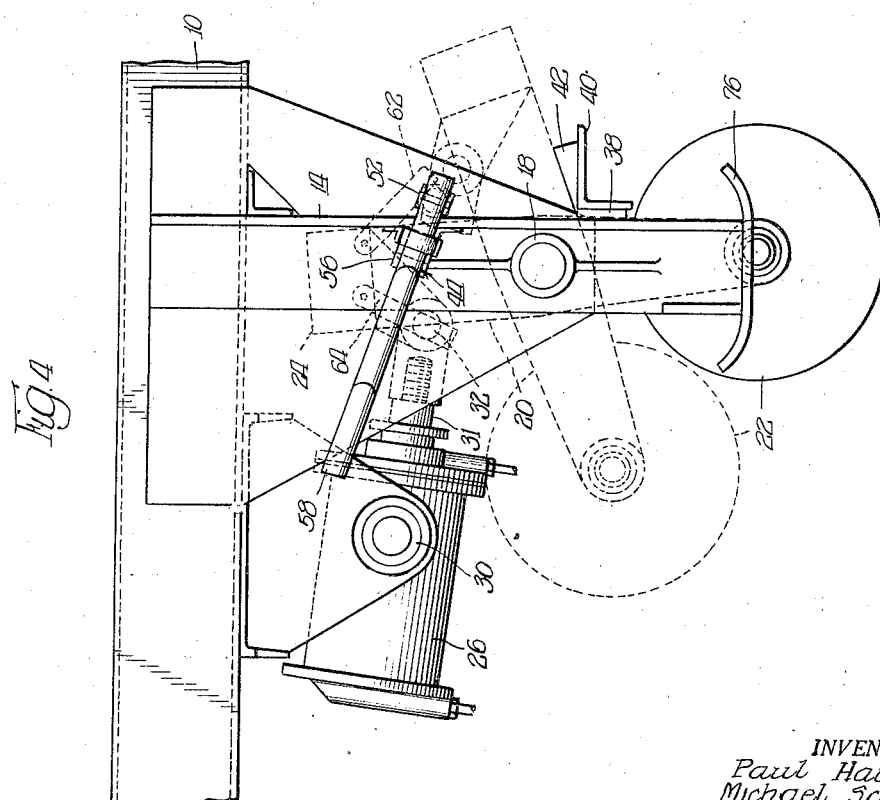

2,431,245

UNITED STATES PATENT OFFICE 2,431,245

LANDING GEAR FOR TRAILERS AND THE LIKE

Paul Haig, Chicago, Ill., and Michael Schillo, East Chicago, and John Tompkins, Highland, Ind., assignors to Inland Steel Company, Chicago, Ill., a corporation of Delaware Application February 5, 1945, Serial No. 576,194

9 Claims. (Cl. 280—33.1)

The present invention relates to landing devices and more in particular to such devices for use in connection with truck trailers and the like.

Among the objects of the present invention is to provide novel landing gear for truck trailers which can be readily manufactured and installed at relatively low cost and which can be easily manipulated into and out of operative position for use in connection with conventional trailers drawn by trucks through a fifth wheel connection.

More particularly, the present invention contemplates novel balanced landing gear operable by means of vacuum, compressed air, or the like, whereby the same can be readily manipulated in connection with the operation of a trailer drawn by a truck.

Another object of the present invention is to provide a landing gear involving a support for the front end of a trailer movable into and out of its operative position and which gear embodies in its assembly safety mechanism in the form of brackets normally extending beyond the retracted gear for providing a support for the trailer in the event the load is dropped when the landing gear is in retracted position. More particularly, the present invention contemplates the incorporation of shoes to allow the trailer to skid somewhat in the event the load is dropped, thereby relieving the stress on the safety brackets.

The present invention also has as an object the idea of providing a novel landing gear operable into and out of its load supporting position and with which is associated means automatically operable to lock the landing gear at the end of its travel either in its operative or inoperative position.

Other objects, features, capabilities and advantages are comprehended by the invention, as will later appear and as are inherently possesssed thereby.

Referring now to the drawings,

Figure 1 is a top plan view of a truck and trailer having parts cut away to show more in detail a landing gear made in accordance with the present invention;

Figure 2 is a fragmentary view in side elevation of the trailer-truck assembly shown in Figure 1 of the drawings;

Figure 3 is a view in cross-section through the trailer of Figures 1 and 2 of the drawings showing the structure of the landing gear more in detail;

Figure 4 is a fragmentary view in side elevation of the landing gear shown in Figure 3 of the drawings;

Figure 5 is a fragmentary view in end elevation of the assembly shown in Figure 4 of the drawings;

Figure 6 is a fragmentary view in section taken in the plane represented by line 6—6 of Figure 5 of the drawings; and Figure 7 is a fragmentary view in side elevation of a modified form of construction for a landing gear made in accordance with the present invention.

Referring now more in detail to the drawings, a landing gear made in accordance with the present invention and generally referred to by the reference numeral 2 is shown in Figures 1 and 2 as being connected adjacent the front end of a trailer 4 normally towed by a truck 6 through the medium of a fifth wheel connection 8. The landing gear 2 is incorporated into the underframe 10 of the trailer 4 and normally depends downwardly therefrom, the supporting structure being constituted by the depending brackets 12 and 14 suitably secured to the underframe 10 and providing journal bearings 16 and 18, respectively, for a frame 20 rotatably mounted therein. This frame has one or more wheels 22 journaled at the lower end thereof and is further provided with a counterbalancing element 24 so that the landing gear as a whole is substantially balanced for rotary movement about the journal bearings 16 and 18.

The wheels 22 are moved into and out of their ground engaging position for the support of the front end of the trailer through fluid actuating means comprising a cylinder 26 pivoted to the underframe structure, as at 28 and 30, and having a piston operable therein which, through a piston rod 31, is connected as at 32 to the frame 20 of the landing gear.

Fluid for actuating the piston for the movement of the landing gear about its pivot points 16 and 18 is supplied to the air cylinder 26 from a suitable source controlled by a four-way valve 34. In the present illustration of the embodiment, the air source is taken from the line 36 of the compressed air system for the brakes for the truck and trailer furnished by the compressor installed in the truck and which is operated by the internal combustion engine therefor. While compressed air is used in accordance with the present illustration of the invention, it is to be understood that the fluid actuated piston for the landing gear may be operated by vacuum as well and that a separate system may be installed for operation of the landing gear independently of the air brakes, if it be so desired.

The landing gear as shown in full lines of Figure 4 of the drawings is in a position for supporting the front end of the trailer and is also shown in dotted lines in its retracted position which would maintain where the trailer at its forward end is being supported by the fifth wheel of the truck. In the normal ground engaging position of the wheels 22, the frame 20 normally abuts the cushion 38 provided on the cross member 40. The cross member 40 is further provided with one or more wedge elements 42 which limit the movement of the frame 20 in the retracted position of the landing gear.

Due to the balanced condition of the frame 20, the same may be readily moved into and out of its normal operative position with a minimum expenditure of air from the brake system for the truck trailer assembly and said movement is readily controlled by the valve 34.

In order to lock the landing gear at the end of its travel either into or out of its normal operative position, novel locking means 44 is provided which in the present illustrative embodiment of the invention is associated with the safety bracket 14. Such locking mechanism comprises a locking element 46 slidably mounted as at 48 in the safety bracket 14 and which projects inwardly therefrom into the path of movement of the frame element 21 and is adapted to engage the same for locking the frame 20 in position. This locking element 46 is normally urged into its inner-most position through the medium of a spring 50 and the said element at its outer end is connected through the links 52 to a lever 54 pivoted as at 56 and having a handle 58 for manipulation thereof. By movement of lever 54, locking element 46 can be readily retracted to permit movement of the frame 20 in either direction, depending upon whether the same is in its normal operative position or in a retracted position.

Pivotally mounted upon the frame element 21, as at 66 and 68, are two stop members 62 and 64 interconnected by the coil spring 70 normally extending beyond the opposite edges of frame element having their inward movement limited by the abutments 72 and 74, respectively. As shown in Figure 6 of the drawings, the locking element 46 is disposed in engagement with the frame element 21 to hold the landing gear in its normal operative position. Upon movement of the lever 54 and retraction of the locking element 46, stop member 62, under the action of coil spring 70, is moved into engagement with the abutment 72 in a position to prevent inward movement of the locking element 46 upon release of the lever 54. As the frame 20 rotates toward its retracted position, the locking element 46, under the action of coil spring 50, snaps into end engagement with the outer surface of the frame element 21 and is held in such position until frame element 21 passes beyond the same. At that time locking element 46, under the action of coil spring 50, snaps into locking engagement with frame element 21 to hold the frame 20 in its retracted position. Such movement also displaces the stop member 64, thus positioning the same for movement into end engagement with locking element 46 when the same is retracted by lever 54 when it is again desired to move the landing gear into operative ground engaging position.

In order to avoid the possibility that the operator of the truck may uncouple the trailer and drive away from the trailer before setting the landing gear, the safety brackets 12 and 14 are formed to extend below the wheels 22 when in retracted position and are provided with the shoes, such as 76, so as to prevent injury to the landing gear or damage to the trailer and its load in the event that the above takes place. The shoes 76 are in the form of skids allowing the trailer to move slightly, thereby relieving the stress on the depending safety brackets 12 and 14.

While the above description relates to a landing gear actuated through a fluid medium, nevertheless a balanced landing gear as above described and adapted to be manually operated may be incorporated in a trailer such as shown in Figure 7 of the drawings. Figure 7 is illustrative of a landing gear 78 conforming to the landing gear hereinbefore described but being provided as at 80 with a circular rack, the teeth of which mesh with a gear 82 manually operated through the crank 84 for moving the landing gear as illustrated in the previous embodiment.

The landing gear as shown in Figure 7 has all of the advantages of the previously described structure except for the mechanical advantage inherent in the fluid actuating mechanism of the latter.

While I have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. In a truck trailer, the combination of an underframe, brackets depending from said underframe, a landing gear comprising a load supporting frame pivotally mounted in said brackets and having ground engaging wheels mounted adjacent one end thereof, means for swinging said landing gear into and out of operative position, and means for automatically locking said landing gear at the end of its travel into operative and inoperative positions, said means comprising a spring actuated locking element mounted on at least one of said brackets and directly engageable with said landing gear frame.

2. In a truck trailer, the combination of an underframe, brackets depending from said underframe, a balanced landing gear comprising a frame pivotally mounted in said brackets and having ground engaging wheels mounted adjacent one end thereof, fluid actuating means for swinging said landing gear into and out of operative position, means for automatically locking said landing gear at the end of its travel into operative and inoperative positions, said means comprising a spring actuated locking element mounted on at least one of said brackets and directly engageable with said landing gear frame, and spring actuated stop members movable into engaging relation with said locking element upon initial retraction of said locking element when said landing gear is in either its operative or inoperative position.

3. In a truck trailer, the combination of an underframe, brackets depending from said underframe, a landing gear comprising a frame pivotally mounted in said brackets and having frame elements disposed adjacent thereto, means for automatically locking said frame in a plurality of positions comprising a spring actuated locking element mounted in at least one of said brackets and engageable with said frame element, and opposed spring actuated stop elements engageable with said locking element upon initially retracting the same when said frame is in either its operative or inoperative position.

4. In a truck trailer, the combination of an underframe, brackets depending from said underframe, a balanced landing gear comprising a frame pivotally mounted in said brackets on a substantially horizontal axis and having ground engaging wheels mounted adjacent one end thereof, and fluid actuated means for swinging said landing gear into and out of operative position to thereby lower and retract said wheels, said brackets depending downwardly beyond the pivot axis and below said wheels when in retracted position.

5. In a truck trailer, the combination of an underframe, brackets depending from said underframe, a balanced landing gear comprising a frame pivotally mounted in said brackets on a substantially horizontal axis and having ground engaging wheels mounted adjacent the lower end thereof, and a pivotally mounted fluid cylinder having a fluid actuated piston connected to said landing gear for swinging the same into and out of operative position to thereby lower and retract said wheels, said brackets depending downwardly beyond the pivot axis and below said wheels when in retracted position.

6. In a truck trailer, the combination of an underframe, brackets depending from said underframe, a balanced landing gear comprising a frame pivotally mounted in said brackets on a substantially horizontal axis and having ground engaging wheels mounted adjacent the lower end thereof, a pivotally mounted fluid cylinder having a fluid actuated piston connected to said landing gear for swinging the same into and out of operative position to thereby lower and retract said wheels, said brackets depending downwardly beyond the pivot axis and below said wheels when in retracted position, and a skid shoe fixed to the lower depending end of the brackets respectively.

7. In a truck trailer, the combination of an underframe, brackets depending from said underframe, a landing gear comprising a frame pivotally mounted in said brackets on a substantially horizontal axis, said frame having ground engaging wheels rotatably supported thereby at the lower end thereof, means for swinging said landing gear into and out of operative position to thereby lower and retract said wheels, means for automatically locking said frame at the end of its travel in said operative and inoperative positions, said brackets depending downwardly beyond the pivot axis and below said wheels when in retracted position, and a skid shoe fixed to the lower depending end of the brackets respectively.

8. In a truck trailer, the combination of an underframe, brackets depending from said underframe, a landing gear comprising a frame pivotally mounted in said brackets on a substantially horizontal axis and having ground engaging means mounted adjacent one end thereof, and means for swinging said landing gear into and out of operative position to thereby lower and retract said ground engaging means, said brackets depending downwardly beyond the pivot axis and below said ground engaging means when in retracted position.

9. In a truck trailer, the combination of an underframe, brackets depending from said underframe, a landing gear comprising a frame pivotally mounted in said brackets on a substantially horizontal axis and having ground engaging means mounted adjacent one end thereof, and fluid actuated means for swinging said landing gear into and out of operative position to thereby lower and retract said ground engaging means, said brackets depending downwardly beyond the pivot axis and below said ground engaging means when in retracted position.

PAUL HAIG.
MICHAEL SCHILLO.
JOHN TOMPKINS.

REFERENCES CITED

The following references are of record in the file of this patent:

UNITED STATES PATENTS

| Number | Name | Date |
| --- | --- | --- |
| 2,016,468 | Wagner | Oct. 8, 1935 |
| 2,146,955 | Helms et al. | Feb. 14, 1939 |